Dec. 18, 1951   G. R. ONFREY   2,578,942
REVERSIBLE DISK PLOW FOR TRACTORS
Filed Aug. 12, 1948   5 Sheets-Sheet 1

GEORGE R. ONFREY,
INVENTOR.

BY Hazard & Miller
ATTORNEYS

Dec. 18, 1951  G. R. ONFREY  2,578,942
REVERSIBLE DISK PLOW FOR TRACTORS
Filed Aug. 12, 1948  5 Sheets-Sheet 2

GEORGE R. ONFREY,
INVENTOR.

BY Hazard & Miller

ATTORNEYS

Dec. 18, 1951 G. R. ONFREY 2,578,942
REVERSIBLE DISK PLOW FOR TRACTORS
Filed Aug. 12, 1948 5 Sheets-Sheet 3

GEORGE R. ONFREY,
INVENTOR.

BY Hazard & Miller

ATTORNEYS

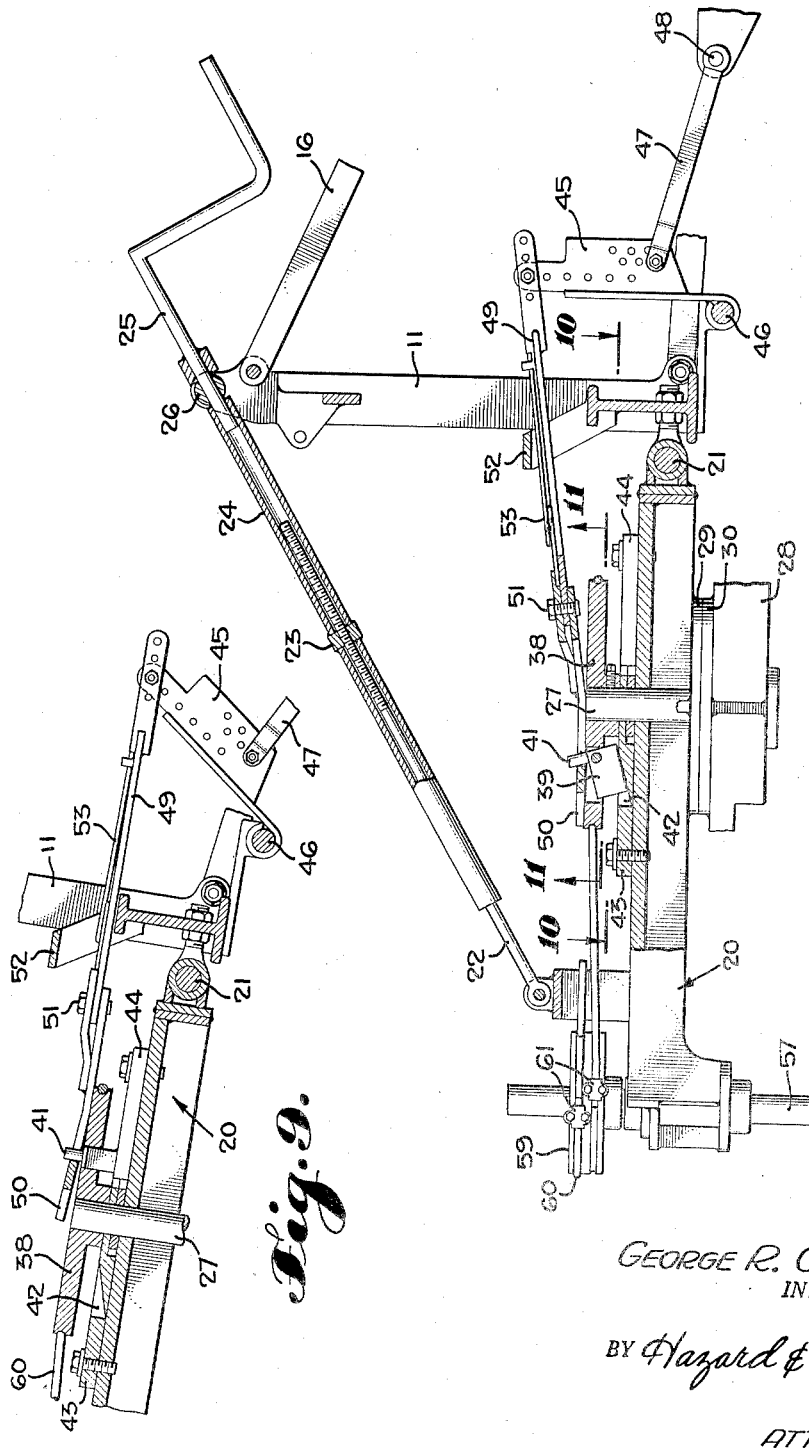

Dec. 18, 1951          G. R. ONFREY          2,578,942
REVERSIBLE DISK PLOW FOR TRACTORS
Filed Aug. 12, 1948          5 Sheets-Sheet 5
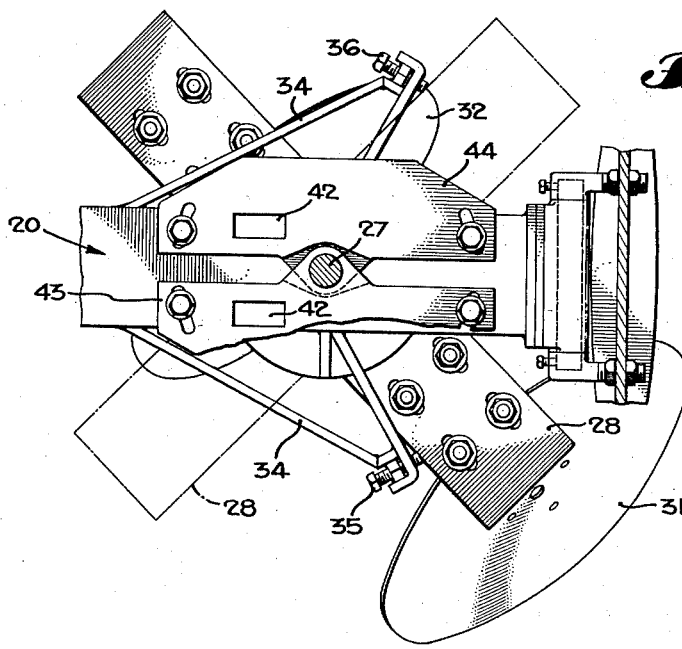
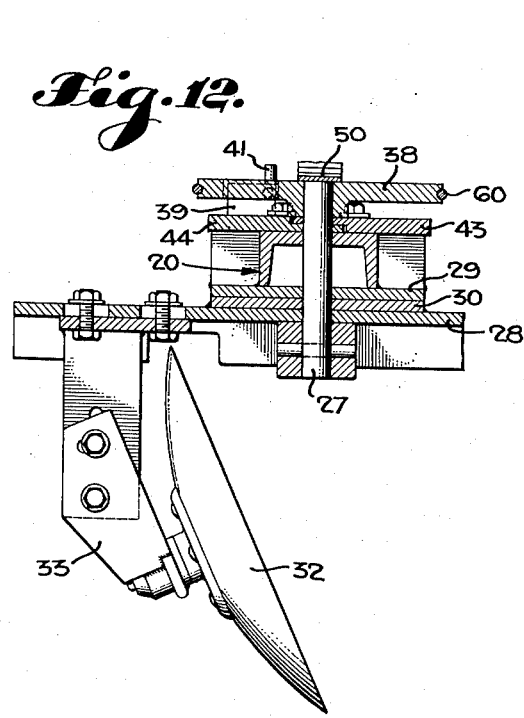
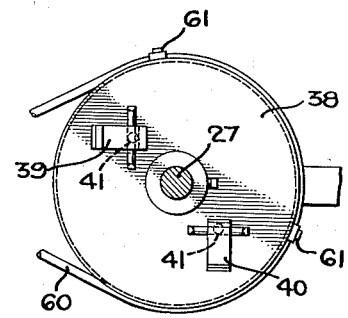
GEORGE R. ONFREY,
INVENTOR.
BY Hazard & Miller
ATTORNEYS

Patented Dec. 18, 1951

2,578,942

UNITED STATES PATENT OFFICE 2,578,942

REVERSIBLE DISK PLOW FOR TRACTORS

George R. Onfrey, Bakersfield, Calif., assignor to Phillips Foundry Company, Bakersfield, Calif., a corporation of California Application August 12, 1948, Serial No. 43,920

15 Claims. (Cl. 97—32)

This invention relates to a reversible disk plow for tractors.

In the conventional or usual construction of tractor-drawn plows, the plows or disks are so arranged as to throw or turn a furrow in one direction only so that, in plowing a given field, it is either necessary to draw the plow across the field in a selected direction and then return without plowing so as to throw or turn the succeeding furrows in the same direction or, in the alternative, to adopt some system of plowing in squares or rectangles to avoid traverses with the tractor in which no plowing is performed.

An object of the present invention is to provide an improved plow for tractors which is reversible so that the disks can be easily and quickly caused to assume positions that will turn or throw the furrow either to the right or to the left. In this way a field may be traversed in one direction, throwing the furrow toward the right and, when traversed in the opposite direction, the furrow can be thrown toward the left. Consequently no empty or idle trips by the tractor are necessary and no pattern for plowing the field need be adopted. On the contary, the tractor operator merely traverses the field in a selected direction, throwing the furrow to one side and in traversing the field in the opposite direction the plow throws the furrow in the opposite direction.

The invention herein disclosed is particularly suitable for use on tractors having drawbars which can be forcibly raised and lowered, and in applying a plow embodying this invention to a tractor of that type the reversibility of the positions of the plows becomes highly automatic in that when the end of a furrow has been reached the drawbar may be elevated to lift the plows from the soil and facilitate turning. When the drawbar is again lowered to return the plows to the soil the shifting of the position of the plows has been automatically effected. It is consequently another object of the invention to provide a plow attachable to tractors having drawbars that can be forcibly raised and lowered and which will automatically alter or shift the positions of the plows whereby consecutive raisings and lowerings of the drawbar will automatically cause the plow to turn the furrow first to the right and next to the left.

Another object of the invention is to provide a plow having the above mentioned characteristics wherein there is a furrow wheel arranged behind the plow disks and which is automatically reversed as to position whenever the plows are altered in their position to throw the furrow to the right or to the left. Consequently whenever the plow is in a position to turn the furrow to the right the furrow wheel will automatically be positioned properly with relation thereto and, conversely, when the plow is positioned to turn the furrow in the opposite direction the furrow wheel will have automatically been reversed to accommodate itself to that position of the plow.

Still another object of the invention is to provide a plow which is of relatively simple, sturdy and economical construction, parts of which are readily adjustable and, if necessary, can be easily and quickly replaced.

With the foregoing and other objects in view, which will be made manifest in the following detailed description and specifically pointed out in the appended claims, reference is had to the accompanying drawings for an illustrative embodiment of the invention, wherein:

Figs. 6 and 7 are partial views in plan illustrating details of construction and the manner in which automatic reversal of the positions of the plow disks is accomplished;

Fig. 8 is a longitudinal section on an enlarged scale taken substantially upon the line 8—8 upon Fig. 4;

Fig. 9 is a similar view of a portion of Fig. 8 but illustrating the positions assumed by the parts when the plow is elevated by the drawbar;

Fig. 10 is a horizontal section taken substantially upon the line 10—10 upon Fig. 8 in the direction indicated;

Fig. 11 is a horizontal section taken substantially upon the line 11—11 upon Fig. 8 in the direction indicated; and Fig. 12 is a partial view in vertical section illustrating details of construction.

Figure 1:
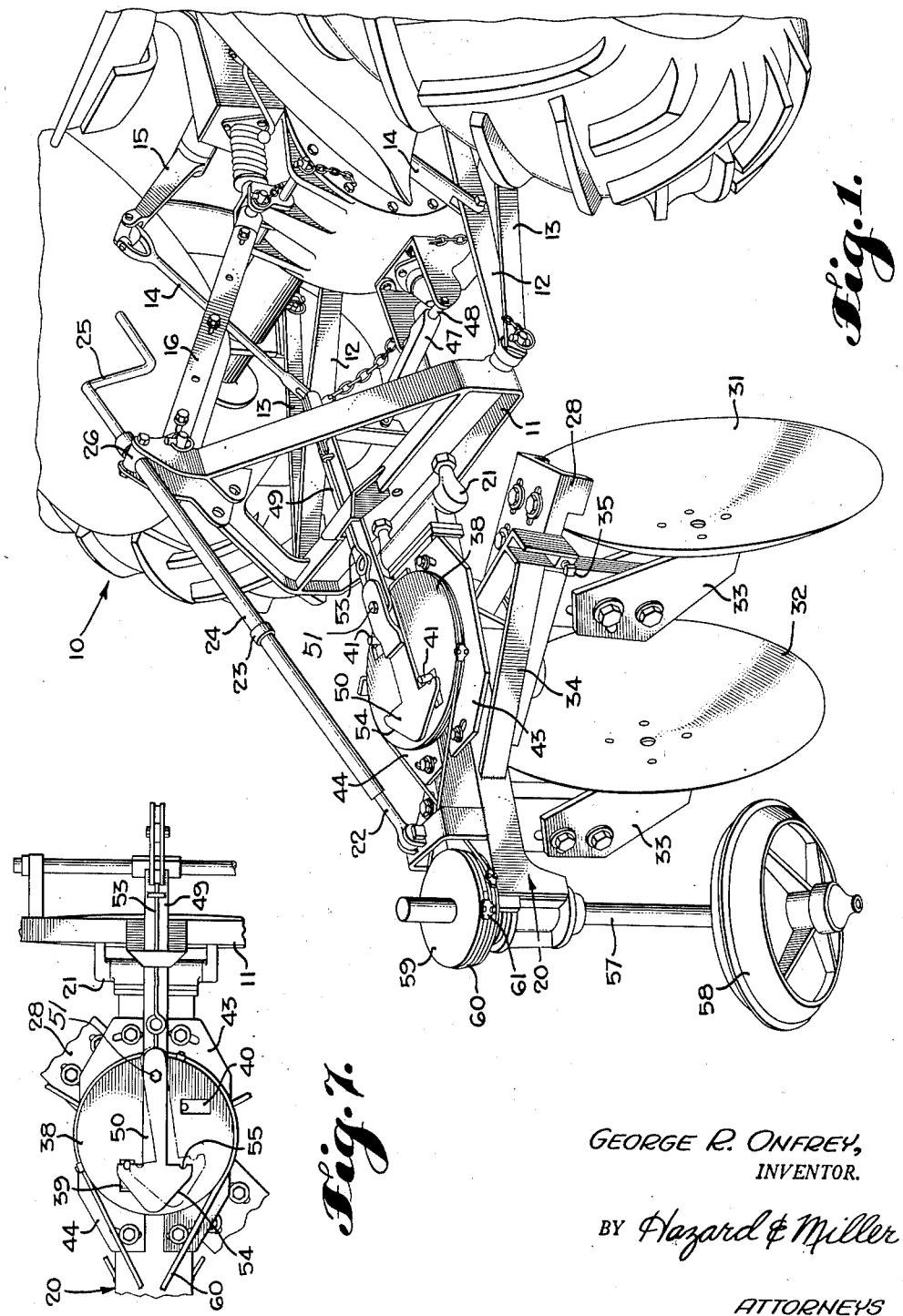
Figure 1 is a partial view in perspective of the rear portion of a tractor illustrating the plow embodying the present invention as having been applied thereto.

Referring to the accompanying drawings wherein similar reference characters designate similar parts throughout, 10 indicates generally a tractor, the drawbar 11 of which is of generally triangular form. The base of the drawbar is pivotally connected at its ends to pairs of links the inner links of which are indicated at 12 and the outer stabilizing links of which are indicated at 13. These links in turn are pivotally connected at their forward ends to the frame of the tractor 10 enabling the drawbar to be raised and lowered. The inner links 12 of each pair have links 14 pivotally connected thereto which are connected through universal joints to cranks 15. The cranks 15 are forcibly oscillated in any suitable manner such as by a hydraulic mechanism incorporated in the structure of the tractor but in so far as the present invention is concerned the particular manner in which the cranks are power actuated to effect a raising and lowering of the drawbar is immaterial. When the cranks 15 are forced forwardly these cause the links 14 to elevate the links 12 to forcibly lift the drawbar and, conversely, when the cranks 15 are forced rearwardly the drawbar 11 will be forcibly depressed.

As a means for maintaining the drawbar 11 in a substantially upright position whether elevated or depressed, a link 16 is pivotally connected to the top of the drawbar and to the tractor frame and as this link is not of equal length to that of the links 12 and 13, the drawbar 11 will consequently not be maintained in a perfectly vertical position throughout its up and down movement. The fact that the drawbar may tilt forwardly slightly when it is raised is not detrimental in so far as the present invention is concerned. The above described structure may be regarded as somewhat conventional on tractors now on the market.

The plow constituting the present invention consists generally of a frame 20 which is pivotally mounted at 21 on the drawbar 11. This frame has a bolt 22 pivotally connected thereto adjacent its rear end, said bolt having a nut 23 mounted on a sleeve 24 that may be rotated by a crank 25 that extends through a pintle 26 that is pivotally mounted on the top of the drawbar. Thus by rotating the crank 25 the frame 20 may be caused to pivot at 21 to assume any desired adjusted position with relation to the drawbar. Adjustment of the frame 20 by means of the crank 25 with relation to the drawbar enables both disk plows to dig to equal depths.

A post 27 extends vertically through the frame and serves to rotatably support a plow beam 28 on the under side of the frame. Opposed bearing plates 29 and 30 may be mounted on the frame and on the plow beam to form an adequate bearing between the plow beam and the frame although enabling the plow beam to swing in a horizontal plane with relation to the frame. One or more plows are mounted on the plow beam 28 and while these plows may conform to any conventional or preferred construction there have been illustrated two disk plows 31 and 32 which are mounted on the plow beam by means of conventional plow holders 33.

On the sides of the frame 20 there are welded or otherwise rigidly secured outstanding braces 34, the lower ends of which carry adjustable screws 35 and 36 that are engageable with the sides of the plow beam to limit rotational movement of the plow beam with relation to the frame 20. Thus when the plow beam has swung into the full line position shown in Fig. 10 and illustrated in Figs. 1, 2 and 4, the plows 31 and 32 will be in a position to turn the furrow toward the right, reference being had to the direction of movement of the tractor in towing the plow. On the other hand, if the plow beam 28 is swung into the dotted line position shown in Fig. 10 and illustrated in Figs. 3 and 5, the plows 31 and 32 thereon will have been turned into such a position as to turn or throw the furrow to the left. The rotational or swinging movement of the plow beam is thus restricted or limited to an arc in the neighborhood of eighty degrees which is variable and adjustable by adjusting the screws 35 and 36 on the braces or outriggers 34.

The plow beam 28 and the post 27 to which it is rigidly secured are forcibly rotated or swung through this arc by means of a disk 38 which is rigidly mounted on the post adjacent the top thereof. This disk has angularly related apertures formed therein within which are disposed pivoted latches 39 and 40. These latches have upstanding pins 41 thereon which extend upwardly above the top surface of the disc 38. The latches, when in their rearmost positions, are adapted to fall by gravity into recesses 42 which are formed in the upper surfaces of two opposed and overlapping plates 43 and 44 which are adjustably secured to the top of the frame 20.

By adjusting the positions of the plates 43 and 44 with relation to the frame 20 and by adjusting the screws 35 and 36, the plow beam can be locked rigidly in either of its two extreme positions. In other words, when the plow beam is engaging the screw 35, the corresponding latch will drop into its recess 42 so that the plow beam will be locked in a position bearing against the screw 35. In a similar manner, when screw 36 is engaged by the plow beam its latch will serve to rigidly hold the plow beam thereagainst.

A link 45 is pivotally mounted as at 46 upon the drawbar 11 and this link is pivotally connected to a link 47 which, in turn, is pivotally connected to the tractor frame as at 48. The link 47 is materially shorter than any of the links 12, 13 or 16 so that, as the drawbar 11 is lifted, link 45 will be caused to forcibly swing forwardly. Conversely, when the drawbar 11 is depressed, link 45 will be caused to forcibly swing rearwardly. The upper end of this link is pivotally connected to a push and pull rod 49 which has an arrow-head-shaped cam 50 pivotally connected thereto as indicated at 51. The push and pull rod 49 is guided during its forward and rearward movement by a guide 52 mounted on the drawbar 11. A spring 53 is mounted on the rod 49 and is engageable with the arrow-head-shaped cam 50. The function of this spring is to urge the cam into a neutral or central position illustrated in full lines on Fig. 7 but enabling the cam to swing about its pivot 51 to the right or to the left, one of which positions is illustrated by dotted lines on Fig. 7. The cam 50 presents cam edges 54 which are also engageable with the pins 41 on the two latches 39 and 40.

Figure 4:
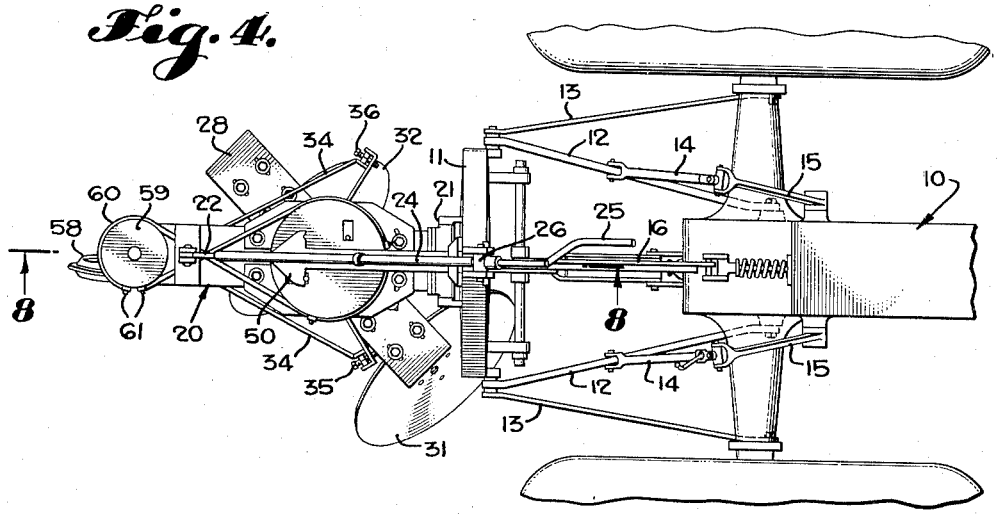
Fig. 4 is a top plan view of the plow in the position illustrated in Fig. 2.
Figure 5:
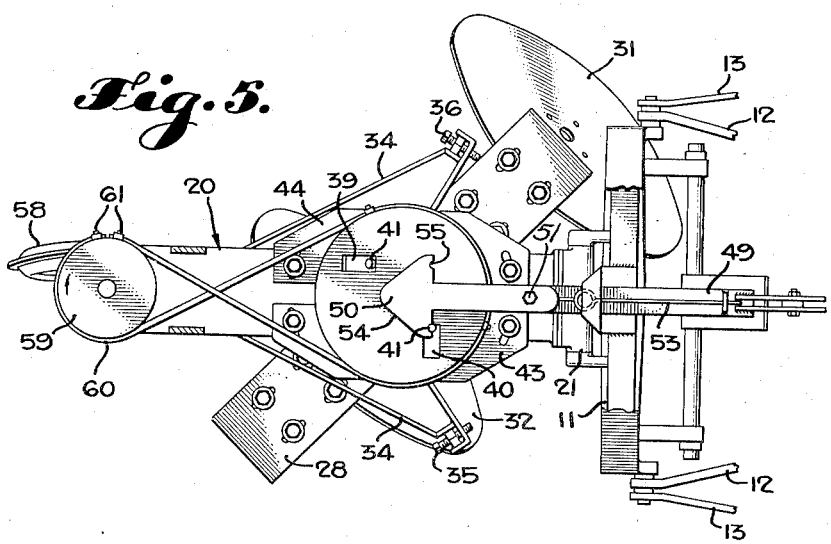
Fig. 5 is a similar view but illustrating the plow as having been turned into the position illustrated in Fig. 3.
Figure 6:
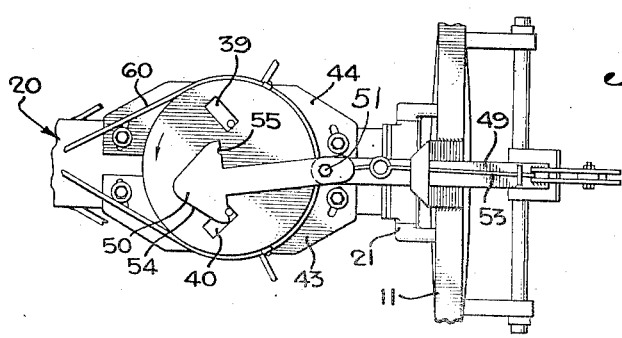

When the drawbar 11 is in its lower or depressed position the cam 50 is in its rearmost position as illustrated in Fig. 4 wherein the pin 41 on latch 40 has been engaged. However, when the drawbar 11 is forcibly lifted during the course of its upward movement, link 45 will be drawn forwardly by link 47, thus drawing the rod 49 forwardly and pulling the cam 50 forwardly with relation to the disk 38. The first forward movement of the cam 50 is effective to rotate the latch 40 to lift the latch out of its recess 43 in the plate 44. When the latch has been lifted out of its recess the disk 38 is unlocked and is free to rotate, causing the post 27 and the plow beam 28 to rotate therewith. As the upward movement of the plow beam continues the cam 50 will proceed from the position shown in Fig. 4 through the position shown in Fig. 6, to the position shown in Fig. 5, thus turning the disk 38 and the plow beam from the position shown in Fig. 4 to the position shown in Fig. 5. During this rotation of the disk 38, latch 39 is moved from its forwardmost position to its rearwardmost position, as shown in Fig. 5, and during this movement its pin 41 is caused to clear the cam member 50 by reason of the cam member being swung laterally due to the engagement of its notch 55 with the pin 41 on the latch 40. When the latch 39 reaches its rearwardmost position it may fall by gravity into its recess 42 in the plate 44, thus locking the disk 38 and consequently the plow beam 28 in the position shown in Fig. 5. When the drawbar 11 is again lowered or depressed, link 45 will, of course, be forced rearwardly returning the cam 50 to its rearwardmost position. During such movement the cam edge 54 will engage the pin 41 on latch 39 and deflect the cam 50 laterally as shown in dotted lines in Fig. 7 until the cam reaches its rearwardmost position wherein the spring 53 will return the cam to its full line position shown in Fig. 7, engaging the pin 41 on the latch 39. While the plow beam is thus locked in the position shown in Fig. 5, the disk plows 31 and 32 thereon may throw or turn the furrow to the left and the plow is thus automatically preconditioned for a return of the plow to the position shown in Fig. 4 the next time that the drawbar 11 is elevated. When the drawbar 11 is again elevated, cam 50 is again drawn forwardly, causing the latch 39 to be withdrawn from its recess 42 thus unlocking the disk 38 and the plow beam and allowing the disk and plow beam to be reversely swung from the position shown in Fig. 5 to the position shown in Fig. 4. The succeeding lowering of the plow beam causes the cam 50 to return to the position shown in Fig. 4 to engage the pin 41 on latch 40, thus preparing the plow for a subsequent swinging of the plow beam from the position shown in Fig. 4 to the position shown in Fig. 5. In this manner, when the end of one furrow has been reached, the plow beam 11 can be forcibly lifted to lift the plows 31 and 32 out of the soil. The tractor may then be turned around and the plow is automatically turned or adjusted to throw the furrow in the opposite direction in making the return trip across the field.

At the extreme rear of the frame 20 a bearing is provided for a vertical rotatable post 57 on the bottom of which there is rotatably mounted in the conventional manner a furrow wheel 58 which is inclined so as to engage the wall of the plowed furrow to carry or sustain the reaction occasioned by the plowing with the plows. It is, of course, desirable to reverse the inclination of the furrow wheel whenever the positions of the plows are reversed to turn the furrow to the left or right. To this end the top of the rotatable post 57 is equipped with a disk 59, the periphery of which is grooved to accommodate a cable 60. The periphery of the disk 38 is also grooved to accommodate this cable which is trained about both disks so as to have crossed reaches therebetween. Cable clamps 61 are applied to the disks and serve to anchor the cable thereto so as to prevent slipping. As will be observed from an inspection of Figs. 1, 4 and 5, the ratio of the diameters of the two disks 38 and 59 is approximately two to one, the intention being that whenever the disk 38 rotates through its arc of approximately eighty degrees in reversing the positions of the plows the disk 59, together with the post 57 and the furrow wheel 58, will be rotated through one hundred sixty degrees. Consequently, as will be observed from a comparison of Figs. 4 and 5, when the plow beam moves from one of its extreme positions to the other, the furrow wheel will have been automatically shifted through one hundred sixty degrees so as to properly accommodate itself to the newly assumed positions of the plows.

By reason of the crossed reaches of the cable 60 it will be observed that the furrow wheel will be rotated in a reverse direction from the direction of rotation of the plow beam. This arrangement is preferred so that the furrow wheel may be positioned as close behind the plows as possible but in the course of swinging the plow beam and turning the furrow wheel the rear plow and its associated structure on the plow beam will clear and not interfere with the furrow wheel. Thus by swinging the furrow wheel rearwardly or in a reverse direction to that of the plow beam, the furrow wheel and the rear plow will clear each other even though the furrow wheel, when in operative position, is located very close to the plow.

Figure 2:
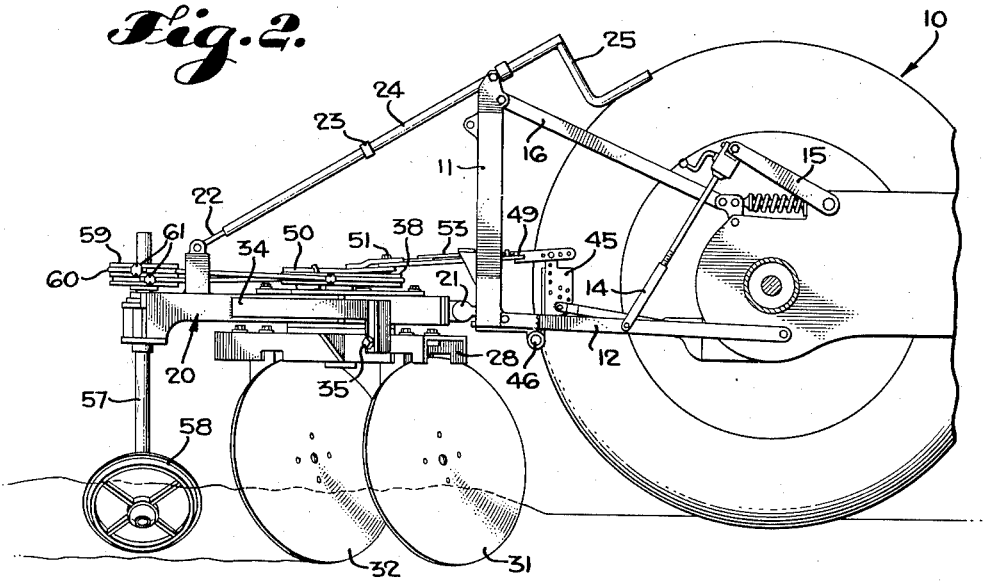
Fig. 2 is a view in side elevation of the plow illustrated in Fig. 1 illustrating the plow in that position wherein the furrow will be turned toward the right.
Figure 3:
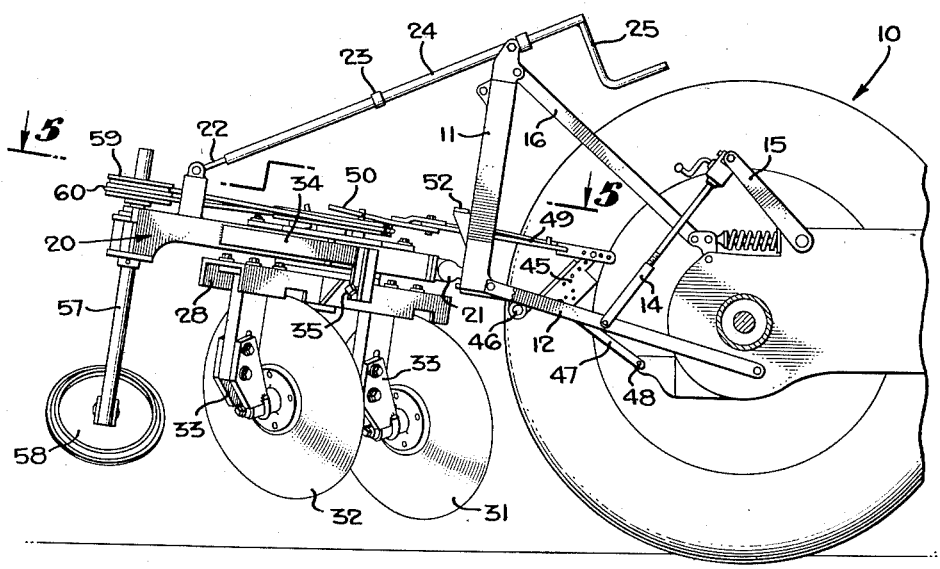
Fig. 3 is a view similar to Fig. 2 but illustrating the plow as having been lifted from the soil by the tractor drawbar and the disks and furrow wheel thereof as having been turned into a position wherein the furrow will be turned toward the left.

From the above described construction it will be appreciated that a new and highly advantageous plow is provided which is applicable to tractors having drawbars that may be elevated and depressed. When the drawbar is in depressed position the plows are maintained in soil-tilling position, as illustrated in Fig. 2, but when the end of a furrow has been reached, on lifting the drawbar, the plows and furrow wheel are lifted clear of the soil and are automatically reversed in position with relation to the manner in which the furrow is to be turned. Consequently, while the drawbar is in elevated position the tractor may be easily and quickly turned about and on the return trip across the field, on lowering the drawbar, the plows will be caused to turn the furrow in the desired direction and the furrow wheel will be effective to perform this normal function even under these reversed conditions. The depth of cut by the plows can at all times be adjusted by rotating the crank 25. In this manner a field may be easily plowed with consecutive trips thereacross in opposite directions and at the end of each trip an automatic reversal of the plow is accomplished merely by the raising and lowering of the drawbar.

It will be observed that the supports for the plows are adjustable with relation to the plow beam and that the angle of pitch of the plows with relation to the plow supports is also adjustable. These adjustments are accomplished by bolt and slot connections between the various parts as illustrated. In a similar manner adjustments of the plates 43 and 44 with relation to the frame are provided by bolt and slot connections. Such adjustments are highly preferred but it will be appreciated that other and equivalent forms of adjustments may be used if desired.

While the present invention has been primarily designed for use on tractors having drawbars capable of being forcibly raised and lowered and wherein the ground wheels of the tractor itself constitute the ground wheels for the plow, it will be appreciated that the invention is not necessarily restricted thereto. It may be incorporated in a plow having its own ground wheels relatively to which the plows can be raised and lowered. Such a construction may be employed where the number of plows carried by the plow beam is quite high and the tractor is not equipped with a drawbar that may be raised and lowered. In such a construction any element on the plow which will effectively raise and lower the frame 20 with relation to the ground wheels of the plow will effectively serve the same purpose as the drawbar in bringing about an automatical reversal of position of the plow beam and the furrow wheel.

Various changes may be made in the details of construction without departing from the spirit and scope of the invention as defined by the appended claims.

I claim:

1. A plow attachable to tractors having power-elevatable drawbars comprising a frame adapted to be attached to the drawbar thereof, a plow beam rotatably mounted upon the frame for rotation about a vertical axis, a plow mounted on the plow beam adapted to be carried thereby into one position wherein it will throw a furrow to the right and also into another position to throw to the left, a furrow wheel rotatably mounted on the frame behind the plow beam for rotation about a vertical axis, means operatively connecting the furrow wheel to the plow beam to cause the furrow wheel to alter its position in conformity with the position assumed by the plow on the plow beam, and means for altering the position of the plow beam and of the furrow wheel by the elevation of the frame with relation to the tractor.

2. A plow for tractors having a drawbar adapted to be raised and lowered comprising a frame attachable to the drawbar, a plow beam rotatably mounted on the frame for rotation about a vertical axis, a plow mounted on the plow beam adapted to be carried thereby into one position to throw a furrow to the right and also to another position to throw to the left, a disk rigidly secured to the plow beam, locking means on the disk for locking the disk and plow beam in either of such positions, and means operatively connecting the tractor and the locking means for causing the locking means to release the disk and plow beam and to swing the plow beam from one position to the other on raising the drawbar.

3. A plow for tractors having a drawbar adapted to be raised and lowered comprising a frame attachable to the drawbar, a plow beam rotatably mounted on the frame for rotation about a vertical axis, a plow mounted on the plow beam adapted to be carried thereby into one position to turn a furrow to the right and also into another position to turn to the left, a disk rigidly secured to the plow beam, locking means on the disk for locking the disk and plow beam in either of such positions, means operatively connecting the tractor and the locking means for causing the locking means to release the disk and plow beam and to swing the plow beam from one position to the other on raising the drawbar, and a furrow wheel rotatably mounted on the frame behind the plow operatively connected to the disk to have its position reversed when the plow beam is turned from one position to the other.

4. In combination with a tractor having a drawbar adapted to be forcibly raised and lowered, a frame pivotally connected to the drawbar, means providing an adjustable brace between the frame and the drawbar for adjusting the position of the frame with relation to the drawbar, a plow beam pivotally mounted upon the frame for rotation about a vertical axis, a plow mounted on the plow beam adapted to be carried thereby into one position to throw a furrow to the left and also into another position to throw a furrow to the right, a furrow wheel mounted upon the frame for rotation about a vertical axis, means forming a driving connection between the plow beam and the furrow wheel whereby upon swinging the plow beam the position of the furrow wheel will be reversed, means for swinging the plow beam from one position to the other whereby the furrow may be turned to the right or to the left as desired, said means being operable upon raising the drawbar, and means for releasably locking the plow beam in either of its extreme positions.

5. In combination with a tractor having means for raising and lowering the drawbar thereof, a plow attachable to the drawbar and movable to one position to throw a furrow to the left and also to another position to throw a furrow to the right, a furrow wheel for the plow, and means operable by the raising of the drawbar causing a change-over of the plow from one position to the other and altering the position of the furrow wheel to correspond to the positions assumed by the plow.

6. In combination with a tractor having means for raising and lowering the drawbar thereof, a frame attachable to the drawbar of the tractor, a disk plow mounted for rotary movement thereon about a vertical axis movable to one position to throw to the left and also to another position to throw to the right, means for locking the plow against movement relative to the frame in either of the two positions above mentioned, and means connected to the tractor operable by the raising of the drawbar for swinging the plow to cause a change-over of the plow from one position to the other.

7. In combination with a tractor having means for raising the drawbar thereof, a frame attachable to the drawbar of the tractor, a disk plow mounted for rotary movement thereon about a vertical axis movable to one position to throw to the left and also to another position to throw to the right, means for locking the plow against movement relative to the frame in either of the above mentioned positions when the drawbar is in its lowered position, a furrow wheel on the frame behind the plow rotatable thereon about a vertical axis, means for rotating the furrow wheel through approximately 180° when the plow is shifted from one position to the other, and means connected to the tractor operable by the raising of the drawbar for swinging the plow and thus rotating the furrow wheel from one position to the other.

8. A plow for tractors having a drawbar adapted to be raised and lowered comprising a frame attachable to the drawbar, a plow beam rotatably mounted on the frame for rotation about a vertical axis, a plow mounted on the plow beam adapted to be carried thereby into one position to throw to the right and also into another position to throw to the left, and means operatively connecting the tractor and the plow beam responsive to the elevation of the drawbar to swing the plow to cause a change-over from one position to the other.

9. A plow for tractors having a drawbar adapted to be raised and lowered comprising a frame attachable to the drawbar, a plow rotatably supported from the frame for rotation about a vertical axis movable to one position to throw to the left and also movable to another position to throw to the right, and means operatively connecting the tractor and the plow responsive to the elevation of the drawbar to swing the plow to cause a change-over from one position to the other.

10. A plow device for tractors having a drawbar adapted to be raised and lowered comprising a plow, means carried by the drawbar for rotatably supporting the plow for rotation about a vertical axis, the plow adapted to be moved to one position to throw to the left and also to another position to throw to the right, a pair of pins operatively connected to the plow, and means operatively connected to the tractor and responsive to the elevation of the drawbar to engage one of the pins to swing the plow to cause a change-over from one position to the other and to engage the other of the pins upon a succeeding elevation of the drawbar to swing the plow to cause another change-over.

11. A plow device for tractors having a drawbar adapted to be raised and lowered comprising a plow, means carried by the drawbar for rotatably supporting the plow for rotation about a vertical axis, the plow adapted to be moved to one position to throw to the left and also to another position to throw to the right, a pair of pins operatively connected to the plow, means pperatively connected to the tractor and responsive to the elevation of the drawbar to engage one of the pins to swing the plow to cause a change-over from one position to the other and to engage the other of the pins upon a succeeding elevation of the drawbar to swing the plow to cause another change-over, and means for locking the plow in either of its positions.

12. A plow device for tractors having a drawbar adapted to be raised and lowered comprising a plow, means carried by the drawbar for rotatably supporting the plow for rotation about a vertical axis, the plow adapted to be moved to one position to throw to the left and also to another position to throw to the right, a disk rigidly secured to the plow, a pair of pins carried by the disk, a cam operatively connected to the tractor and responsive to the elevation of the drawbar to engage one of the pins to swing the plow to cause a change-over from one position to the other and to engage the other of the pins upon a succeeding elevation of the drawbar to swing the plow to cause another change-over.

13. A plow device for tractors having a drawbar adapted to be raised and lowered comprising a plow, means carried by the drawbar for rotatably supporting the plow for rotation about a vertical axis, the plow adapted to be moved to one position to throw to the left and also to another position to throw to the right, a disk rigidly secured to the plow, a pair of pins carried by the disk, a cam operatively connected to the tractor and responsive to the elevation of the drawbar to engage one of the pins to swing the plow to cause a change-over from one position to the other and to engage the other of the pins upon a succeeding elevation of the drawbar to swing the plow to cause another change-over, and means cooperating with the pins to lock the plow in either of its positions.

14. A plow device for tractors having a drawbar adapted to be raised and lowered comprising a plow, means carried by the drawbar for rotatably supporting the plow for rotation about a vertical axis, the plow adapted to be moved to one position to throw to the left and also to another position to throw to the right, a pair of pins carried by the plow, a cam for engaging the pins operatively connected to the tractor responsive to raising and lowering of the drawbar to be reciprocated along a path between the pins, said cam being withdrawn toward the tractor during elevation of the drawbar whereby the cam engages one of the pins to swing the plow to cause a change-over from one position to the other and upon lowering of the drawbar being advanced toward the pin to be moved back to a position enabling the cam to engage the other of the pins upon a succeeding elevation of the drawbar.

15. A plow device for tractors having a drawbar adapted to be raised and lowered comprising a plow, means carried by the drawbar for rotatably supporting the plow for rotation about a vertical axis, the plow adapted to be moved to one position to throw to the left and also to another position to throw to the right, a pair of pins carried by the plow, a cam for engaging the pins operatively connected to the tractor responsive to raising and lowering of the drawbar to be reciprocated along a path between the pins, said cam being withdrawn toward the tractor during elevation of the drawbar whereby the cam engages one of the pins to swing the plow to cause a change-over from one position to the other and upon lowering of the drawbar from one position to the other and upon lowering of the drawbar being advanced toward the pin to be moved back to a position enabling the cam to engage the other of the pins upon a succeeding elevation of the drawbar, the cam being movably supported by the first named means to allow resistive sideways movement of the cam permitting the cam to maintain engagement with the pins during retreating movement and permitting the cam to be deflected by the pin during advancing movement.

GEORGE R. ONFREY.

REFERENCES CITED

The following references are of record in the file of this patent:

UNITED STATES PATENTS

| Number | Name | Date |
| --- | --- | --- |
| 623,673 | Kavanagh | Apr. 25, 1899 |
| 651,522 | Blain et al. | June 12, 1900 |
| 769,167 | Jobling | Sept. 6, 1904 |
| 805,368 | Lundin | Nov. 21, 1905 |
| 1,023,704 | Abbott | Apr. 16, 1912 |
| 1,127,179 | Brown | Feb. 2, 1915 |
| 1,516,729 | Hiles et al. | Nov. 25, 1924 |
| 1,546,844 | Lee | July 21, 1925 |
| 2,084,629 | Coviello | June 22, 1937 |
| 2,163,832 | Coviello | June 27, 1939 |
| 2,227,366 | Pridgen | Dec. 31, 1940 |
| 2,337,801 | Cook | Dec. 28, 1943 |
| 2,344,301 | Hand | Mar. 14, 1944 |
| 2,414,114 | Martin | Jan. 14, 1947 |
| 2,437,879 | Ferguson | Mar. 16, 1948 |
| 2,453,197 | Clay | Nov. 9, 1948 |

FOREIGN PATENTS

| Number | Country | Date |
| --- | --- | --- |
| 16,983 | Australia | Dec. 23, 1929 of 1928 |
| 638,191 | France | Feb. 14, 1928 |

OTHER REFERENCES

Publications RM-G-3214 by Harry Ferguson, Inc., Detroit 3, Michigan, "Two Way Plow," 2 pages, published before January 1, 1947.